French & Mc Cauley
Globe-Valve.
Reissued Mar. 17, 1868.
No 2898
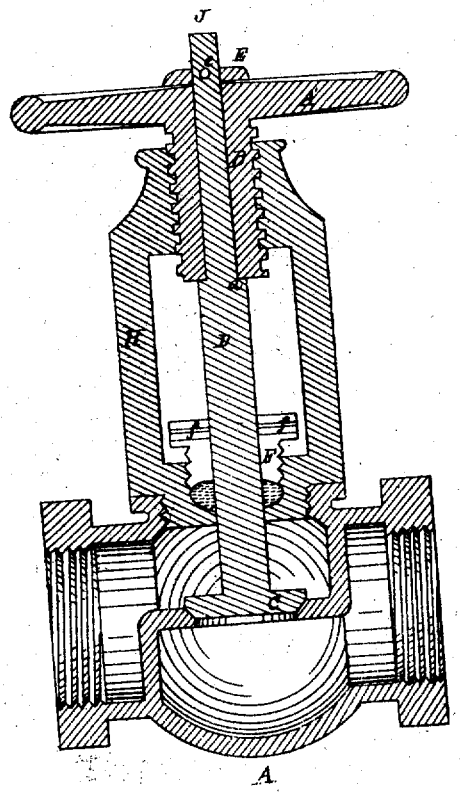
WITNESSES.
E. W. Griffin
W. Gardner
Joseph J. French
R. A. McCauley
By their Attorney
G. J. Palmer

United States Patent Office.

JOSEPH J. FRENCH AND REUBEN A. McCAULEY, OF BALTIMORE, MARYLAND, ASSIGNEES OF JOSEPH J. FRENCH.

*Letters Patent No.* 66,318, *dated July* 2, 1867; *reissue No.* 2,898, *dated March* 17, 1868.

IMPROVEMENT IN GLOBE-VALVES.

The Schedule referred to in these Letters Patent and making part of the same.

TO ALL WHOM IT MAY CONCERN:

Be it known that JOSEPH J. FRENCH, of the city of Baltimore, in the county of Baltimore, in the State of Maryland, invented a new and improved Mode of Making Globe-Valves, for use with steam, water, and gas-pipes; and we do hereby declare that the following is a full and exact description thereof, reference being had to the accompanying drawings, and to the letters of reference marked thereon, in which—

The nature of the invention consists in a globe-valve with a solid arch or casting, carrying at its apex a hollow screw, and having at its lower end, which screws into the bonnet of the valve, a packing-box and bearing for the valve-stem. The stem of the valve is smooth, and works through the packing-box and hollow screw, and terminates in a square projection above the hollow screw and lever-wheel, for the purpose of being enabled to place thereon a brace or lever to grind the valve to its seat in the globe.

To enable others skilled in the art to make this invention, we will proceed to describe the parts thereof.

A is the body of the valve. H is a solid arch or casting, which screws into the bonnet of the valve. B is a hollow screw, to which is attached the lever-wheel A′. C is a valve, to which the stem or shaft D is attached. *a* is a shoulder on the stem D, on which the hollow screw B rests. E is a pin, which holds the shaft D in its place in the hollow screw B, and is so placed that the shaft D will be sufficiently loose to turn in the hollow screw B, and the screw B to turn independently of the shaft D. J is a square projection of the shaft D. F is a plug, having a screw-thread on it, and holes *f f* in its upper edge to allow of a lever being inserted in them for the purpose of screwing the plug up or down. G is a box or receptacle, in the base of the support to the hollow screw, to receive the packing, which is kept in place by the plug F. The part H carrying the hollow screw at its apex, and which screws into the bonnet of the valve, being made of a solid casting, forms a firm support, both at its apex and its base, for the valve-stem, to keep it in line. The opening and closing of the valve are effected by the wheel A′ and hollow screw B, which carries the shaft D up and presses it down, accordingly as the screw B is turned.

To grind the valve C to its seat, unscrew the arch H, and put the grinding-material on the valve; then replace the arch, and by means of a brace or lever rotate the valve until the parts are ground to fit. When the valve is sufficiently ground, take out the arch, clear the ports from sand and grit, then replace the arch, and a perfect-fitting joint will be secured. The valve-stem, which passes through the packing-box, being straight and smooth, will work the packing without twisting or dragging it out.

A globe-valve made as hereinbefore described, will contain the following-described qualities:

First, the arch or support to the hollow screw being cast in one piece, and thereby being rigid, will retain the bearings to the valve-stem perfectly in line.

Second, the valve being ground to its seat in the globe, with its stem in its permanent bearings, can be ground with great facility and ease, and a perfect-fitting joint secured thereby.

Third, the valve-stem being kept in perfect line by the bearings, the valve will always come fair on its seat, and therefore avoid abrasion of the valve or its seat.

Fourth, the valve being set tight upon its seat by means of the hollow screw turning upon the smooth shoulder of the valve-stem, the valve will close upon its seat without turning, and is thereby relieved from friction or abrasion from the turning of the screw.

Fifth, the hollow screw being removed some distance from contact with steam, and being at all times exposed, it thereby avoids all liability of becoming heated and chafed, and can be lubricated and kept in order with ease.

Sixth, the valve-stem being smooth, and working through the packing without turning or twisting, all liability of the packing being dragged out is avoided.

Having thus described the invention, we claim—

A globe-valve composed of the body A, solid support H, carrying at its apex the hollow screw B, and lever A′, with plug to stuffing-box F, the parts all made and arranged substantially as shown and described.

JOSEPH J. FRENCH,
REUBEN A. McCAULEY.

Witnesses:
JAMES C. LYON,
GEO. E. SANGSTON.